(12) United States Patent
Raza

(10) Patent No.: US 6,816,494 B1
(45) Date of Patent: Nov. 9, 2004

(54) METHOD AND APPARATUS FOR DISTRIBUTED FAIRNESS ALGORITHM FOR DYNAMIC BANDWIDTH ALLOCATION ON A RING

(75) Inventor: Humair Raza, Richardson, TX (US)

(73) Assignee: Nortel Networks Limited (CA)

( * ) Notice: Subject to any disclaimer, the term of this patent is extended or adjusted under 35 U.S.C. 154(b) by 961 days.

(21) Appl. No.: 09/619,936

(22) Filed: Jul. 20, 2000

(51) Int. Cl.[7] .......................... H04L 12/28; H04L 12/56
(52) U.S. Cl. ........................... 370/395.41; 370/395.51; 370/468
(58) Field of Search ................................ 370/232, 233, 370/234, 395.41, 403, 404, 405, 406, 437, 445, 465, 468, 395.51

(56) References Cited

U.S. PATENT DOCUMENTS

| | | | | |
|---|---|---|---|---|
| 5,526,356 A | * | 6/1996 | Kim et al. ................... | 370/403 |
| 5,764,392 A | * | 6/1998 | Van As et al. ................ | 398/79 |
| 6,009,106 A | * | 12/1999 | Rustad et al. ............... | 370/523 |
| 6,317,415 B1 | * | 11/2001 | Darnell et al. .............. | 370/230 |
| 6,542,511 B1 | * | 4/2003 | Livermore et al. ......... | 370/406 |

OTHER PUBLICATIONS

"SONET Telecommunications," Copyright © 1997 Tektronix, Inc.

* cited by examiner

*Primary Examiner*—Phirin Sam
(74) *Attorney, Agent, or Firm*—Steubing McGuinness & Manaras LLP

(57) ABSTRACT

A method, apparatus, and computer program product for dynamic bandwidth allocation in a packet switched network having a ring architecture is disclosed. The method includes monitoring an occurrence of a contention of resources at a participating node and its neighboring nodes on the network. In response to a monitored occurrence of the contention of resources, bandwidth is dynamically allocated according to a fairness algorithm. Dynamically allocating bandwidth resolves contention of resources in a fair manner within given fairness constraints while enabling a prescribed maximum utilization of available bandwidth between the nodes. Lastly, the fairness algorithm generates fairness criteria in response to states that are local to the participating node and states obtained from the neighboring nodes.

36 Claims, 6 Drawing Sheets

SIMULATION MODEL FOR 4- NODE PTON ARCHITECTURE

OFFERED LOAD AND THROUGHPUT FOR ROUTER 1 AND 2 FOR SCENARIO 1.

OFFERED LOAD AND THROUGHPUT FOR ROUTER 1 AND 2 FOR SCENARIO 2.

METHOD AND APPARATUS FOR DISTRIBUTED FAIRNESS ALGORITHM FOR DYNAMIC BANDWIDTH ALLOCATION ON A RING

BACKGROUND

The present embodiments relate generally to communication networks, and more particularly, to a distributed fairness algorithm for dynamic bandwidth allocation on a ring.

An example of a communications network is a synchronous optical network (SONET). In particular, SONET is a transmission system technology for use on fiber optic cable networks. SONET systems carry traffic called the payload with overhead blocks. The overhead blocks include section, line, and path overheads. The section and line overheads together are identified as the transport overhead. The path overhead is an end-to-end overhead, while the line and section overheads help move data from one SONET component to another.

SONET specifies a digital hierarchy based upon optical carriers (OCs). SONET defines Synchronous Transport Signals (STSs) which are electrical interfaces used as the multiplexing mechanisms within SONET. SONET network elements (NEs) multiplex STS-1s into STS-N where needed. N is the number of STS-1s that form the STS-N.

High bandwidth connections are accommodated by concatenating STS-1s up to the aggregate speed required. In general, the concatenated STS-1s are designated with a "c." For example, STS-3c represents three STS-1s and provides on the order of 155 Mbps for video and other high speed applications. SONET is multiplexed at the byte level permitting dynamic mapping of services into the broadband STS for transport.

SONET uses optical circuits that operate at prescribed speeds. For example, an STS-1 (or OC-1) operates at a bit rate of 51.840 Mbps and provides a capacity of 28 DS-1 (digital signal level 1) channels or 1 DS-3 (digital signal level 3) channel. An STS-3 (or OC-3) operates at a bit rate of 155.520 Mbps and provides a capacity of 84 DS-1 channels or 3 DS-3 channels, and so on as is known in the art. In addition, SONET bit streams are divided into frames. The frames are 810 characters in size with 36 characters of overhead and 774 characters of payload. On a SONET link, there are 8,000 (125 $\mu$sec long) frames per second with 810 characters per frame and 8 bits in a character, resulting in a basic SONET transmission speed of 51.84 Mbps. As per above, the transmission speed of 51.84 Mbps is the SONET OC-1 basic channel.

With respect to ring architectures, the SONET building block for a ring architecture is the ADM. ADM represents an add/drop multiplexer. The ADM is a multiplexer capable of extracting and inserting lower-rate signals from a higher-rate multiplexed signal without completely demultiplexing the signal. ADMs can be put into a ring configuration for either bi-directional or uni-directional traffic. A main advantage of the ring topology is its survivability; that is, if a fiber cable is cut, the multiplexers have the intelligence to send the services affected via an alternate path through the ring without interruption.

However, there exist certain limitations in connection with the ring architecture. For example, conventional bandwidth allocation is known in the circuit switched domain with respect to the interconnection of packet switches and routers on a ring. Such allocations are typically performed at a transport node in an appropriate unit, such as an STS-1. The issues related to such conventional bandwidth allocation include:

1) The granularity of bandwidth allocation is inconsistent with the actual requirements. This results in an inefficient usage (i.e., a wastage) of valuable network resources.

2) The bandwidth allocation assignment is normally pre-configured and is difficult to update dynamically. Such pre-configured bandwidth allocation assignment is inconsistent with the bursty nature of the connected nodes.

One protocol known in the art includes a Dynamic Packet Transport (DPT) protocol, such as commercially available from Cisco Systems, Inc. of San Jose, Calif. While it addresses some of the above mentioned limitations, the DPT protocol suffers from configuration issues when the bandwidth demands are highly asymmetric.

Therefore, what is needed is an improved method and apparatus for providing more efficient usage of network resources in conjunction with bandwidth allocation on a ring.

SUMMARY

According to one embodiment, a method for dynamic bandwidth allocation in a packet switched network having a ring architecture includes monitoring an occurrence of a contention of resources at a participating node and its neighboring nodes on the network. In response to a monitored occurrence of the contention of resources, bandwidth is dynamically allocated according to a fairness algorithm. Dynamically allocating bandwidth resolves contention of resources in a fair manner within given fairness constraints while enabling a prescribed maximum utilization of available bandwidth between the nodes. Lastly, the fairness algorithm generates fairness criteria in response to states that are local to the participating node and states obtained from the neighboring nodes.

A technical advantage of this embodiment is that a more efficient usage of network resources in conjunction with bandwidth allocation on a ring is made possible.

DETAILED DESCRIPTION

According to the present embodiments, a prescribed fairness algorithm provides fair access of resources to nodes connected on a ring by dynamically assigning bandwidth to each node. The fairness algorithm operates in a distributed manner. Accordingly, no central intelligence is required with respect to the dynamic allocation of bandwidth along the network. Furthermore, based upon information exchanged between neighboring nodes, the fairness algorithm resolves any contention of resources in a fair manner, further as discussed herein.

Figure 1:
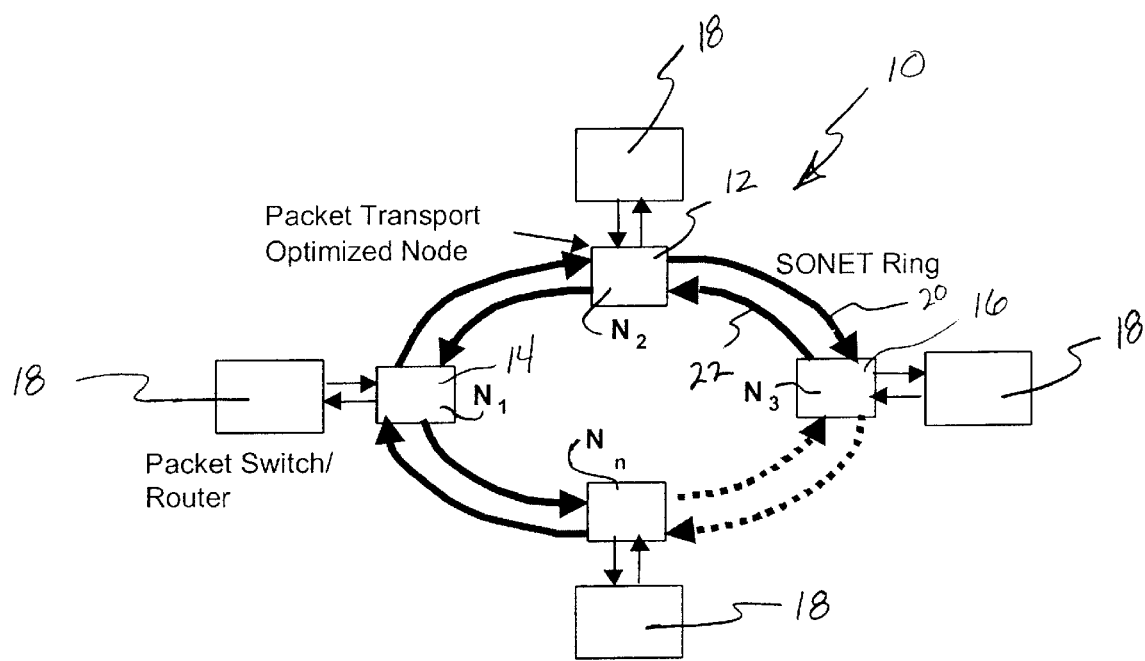
FIG. 1 shows a schematic view of a ring architecture including packet transport optimized nodes (PTONs) according to one embodiment of the present disclosure.

Turning now to FIG. 1, a packet switched network ring architecture 10 having dynamic bandwidth allocation includes a plurality of network nodes ($N_1$, $N_2$, $N_3$, ... $N_n$). The network nodes include at least one participating node 12 and at least two neighboring nodes 14, 16 of the participating node. A respective packet switch/router 18 interfaces with a corresponding node, as shown in FIG. 1. In one embodiment, network 10 includes a SONET ring.

With the present embodiments, each node ($N_1$, $N_2$, $N_3$, ... $N_n$) of the ring network 10 is allowed to transmit data at a full data rate supported by a respective connection media 20,22 so long as there are no contentions of resources. Connection media 20,22 can include fiber optic media, for example, or any other suitable media. Responsive to a detection of contention of resources, the fairness algorithm of the present disclosure assigns appropriate resources to each node such that a prescribed fairness condition is satisfied, as further discussed herein.

Figure 2:
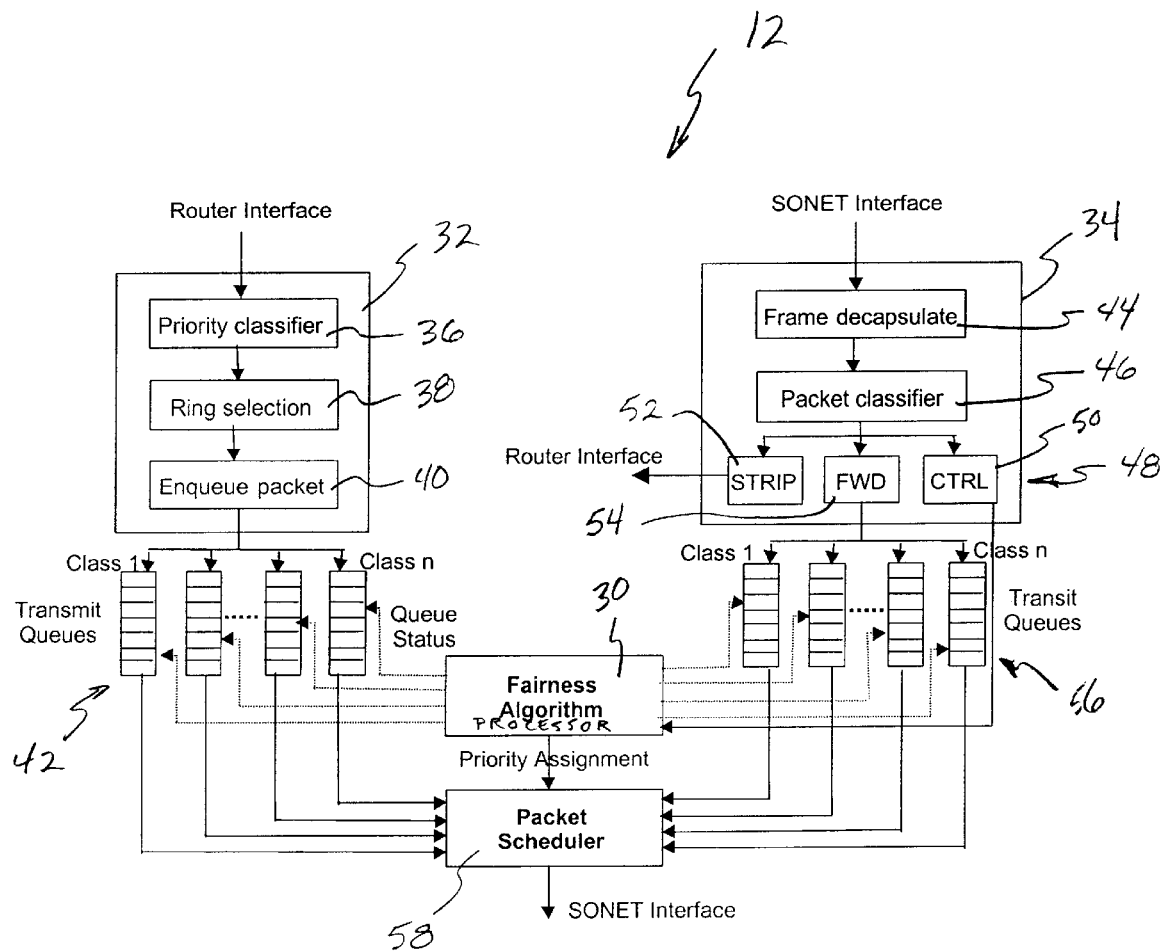
FIG. 2 shows a detailed schematic view of a packet transport optimized node (PTON) architecture according to one embodiment of the present disclosure.

As shown in FIG. 1, the participating node 12 includes a packet transport optimized node (PTON) to be described in further detail with respect to FIG. 2. The participating node includes a contention monitoring processor for monitoring an occurrence of a contention of resources at the participating node and its neighboring nodes on the network. The participating node further includes a dynamic allocation processor. According to the embodiments of the present disclosure, the participating node can also include one or more of the following: a packet switch, a packet router, and a transport node.

Responsive to a monitored occurrence of the contention of resources by the contention monitoring processor, the dynamic allocation processor dynamically allocates bandwidth according to a fairness algorithm for resolving the contention of resources. The contention of resources is resolved in a fair manner within given fairness constraints while enabling a prescribed maximum utilization of available bandwidth between the nodes.

Accordingly, the fairness algorithm generates fairness criteria in response to states that are local to the participating node and states obtained from the neighboring nodes. The processor for dynamically allocating bandwidth further includes means for resolving the contention of resources in a fair manner while maximizing the utilization of available bandwidth. In one embodiment, the participating node 12 exchanges packets with its neighboring nodes 14, 16 through concatenated SONET frames.

In addition, the participating node generates control packets for use in dynamically allocating bandwidth according to the fairness criteria. The participating node can also exchange the control packets between neighboring nodes to facilitate dynamic bandwidth assignment.

As discussed above, in the embodiment of FIG. 2, participating node 12 includes a packet transport optimized node (PTON). The PTON contains at least one computer processor for processing computer readable instructions such as stored on a suitable computer readable media (hard disk drive, diskette, CD-ROM, or other suitable storage media) for causing the processor to perform dynamic allocation of bandwidth according to the fairness algorithm of the present disclosure. According to one embodiment, processor 30 includes a contention monitoring processor and a dynamically allocating bandwidth processor. While shown as a single processor, processor 30 may include a plurality of processors operating in conjunction with one another for carrying out the various functions as discussed herein. The PTON operates through at least two interfaces including a router/packet switch interface 32 and a SONET interface 34.

The router/packet switch interface 32 includes a priority classifier 36, a ring selector 38, and an enqueue packet device 40. Priority classifier 36 classifies a received packet according to a respective priority. The ring selector 38 selects an appropriate ring based on a destination address. The enqueue packet device 40 queues the packet in a transmit buffer or queue 42 of a chosen ring.

The SONET interface 34 includes a frame decapsulator 44, a packet classifier 46, and strip, forward and control devices (referred to collectively, by reference numeral 48). The frame decapsulator 44 decapsulates packets from a received frame. Packet classifier 46 classifies each packet. Strip, forward and control devices 48 perform an appropriate function according to a category of each packet as classified by classifier 46.

Control device 50 of SONET interface 34 directs control packets to processor 30 for the purpose of fairness algorithm processing as discussed herein. Strip device 52 of SONET interface 34 strips packets with a destination address equal to that of a local packet switch/router and routes the stripped packets to the router interface. Forward device 54 places packets transiting through the node in appropriate transit buffers 56 according to a respective priority. Processor 30 provides priority assignment information, in accordance with the fairness algorithm, to packet scheduler 58. Accordingly, packets are forwarded in subsequent SONET frames by packet scheduler 58 in response to the priority assignment information.

According to another embodiment, processor 30 of the participating node 12 includes a fairness index generator for generating a fairness index. The fairness index identifies an effectiveness of the fairness algorithm to provide a fair access to shared resources. In addition, processor 30 includes a utilization index generator for generating a utilization index. The utilization index identifies an effectiveness of the fairness algorithm to provide a full utilization of available resources.

As discussed herein, the embodiments of the present disclosure solve the problem of dynamic allocation of bandwidth to nodes connected through SONET/optical rings. The participating nodes may be packet switches/routers and/or transport nodes involved in the transport of packets. Dynamic bandwidth allocation is an appropriate choice for packet switched networks due to the bursty and asymmetric nature of the traffic being carried through such networks. However, in contrast to circuit switched networked, where the bandwidth allocation is mostly static during the active cycle of the established circuit and there are not possibilities of contention of resources, the dynamic bandwidth assignment requires an appropriate fairness algorithm to avoid possible contentions. The algorithm provides a required amount of fairness to nodes sharing a common pool of bandwidth.

With respect to the present embodiments, in one embodiment, it is assumed that nodes are exchanging packets through concatenated SONET frames. The nodes are allowed to transmit data at the full data rate supported by the connection media such as OC-3c, OC-12c, OC48c, etc., as long as there are no contention of resources. However, when more that one of the nodes wants to share the available bandwidth, the algorithm assigns appropriate resources to each node such that a prescribed fairness condition is satisfied.

The fairness algorithm of the present embodiments solves the bandwidth assignment problem by operating on prescribed states that are local to a given node and that are obtained from the neighboring nodes through appropriate control packets inherent in the underlying protocol. No centrally enforced information other than the state information from two immediate neighboring nodes is necessary. Accordingly, the fairness algorithm can be implemented in a distributed manner at any one or more of the nodes in the ring network.

The required states include:
1) Local Node:
Number of bits transmitted in a SONET frame;
Number of bits forwarded in a SONET frame; and
Number of bits that a node could not transmit due to unavailability of resources.
2) Neighbor Nodes (Upstream and Downstream):
Number of bits transmitted in a SONET frame; and
Number of bits forwarded in a SONET frame; and
Number of bits that a node could not transmit due to unavailability of resources.

Based on these state information and locally specified criteria, the fairness algorithm allocates sufficient resources to the given node such that on average, a same number of bits can be transmitted in a given SONET frame by all participating nodes.

The embodiments of the present disclosure facilitate improvement to existing transport products by providing an additional feature to support the interconnection of packet switches and routers in their native protocols. The present embodiments can be implemented by encoding the fairness algorithm, as discussed herein, into pre-existing bandwidth management software of existing transport products. Encoding of the fairness algorithm may be accomplished using programming techniques well known in the art for performing the functions as discussed herein.

The deficiencies in the art, as discussed herein above, necessitate packet based transport architectures where the available bandwidth is fully utilized. The fairness algorithm of the present embodiments solves the problem of dynamic allocation of bandwidth to various prescribed nodes connected through SONET/optical rings. The participating nodes of the SONET/optical rings may be packet switches/routers and/or transport nodes involved in transport of packets.

Dynamic bandwidth allocation is an appropriate choice for packet switched networks due to bursty and asymmetric nature of the traffic being carried through such networks. However, in contrast to circuit switched networks, where the bandwidth allocation is mostly static during the active cycle of the established circuit and where there are no possibilities of contention of resources, dynamic bandwidth assignment requires an appropriate fairness algorithm to avoid possible contentions. The fairness algorithm of the present embodiments provides a required amount of fairness to various prescribed nodes sharing a common pool of bandwidth on a given optical network by dynamically assigning bandwidth to each node. The algorithm operates in a distributed manner, in other words no central intelligence is required. Based on the state information exchanged between the neighboring nodes, the fairness algorithm resolves the contention of resources in a fair manner while maximizing the utilization of available bandwidth.

In one embodiment, the fairness algorithm processor resides within a Packet Transport Optimized Node (PTON). Details about the architecture of the PTON are presented herein.

Packet Transport Optimized Node (PTON) Architecture

Referring again to FIG. 1, PTON 12 facilitates an interface between a packet switch/router 18 and the SONET ring 10. In one embodiment, the participating nodes (PTONs) exchange packets through concatenated SONET frames. The nodes are allowed to transmit data at the full data rate supported by the connection media 20,22 (such as OC-3c, OC-12c, OC48c) as long as there are no contention of resources. However, when more than one of the nodes wants to share the available bandwidth, the fairness algorithm processor 30 assigns appropriate resources to each node such that a pre-defined fairness condition is satisfied.

In another embodiment, the nodes transmit data on both sides of the ring. The direction to be used for a particular destination will be determined in the setup phase through an ARP (Address Resolution Protocol) like functionality. In addition to data traffic, control packets are required to be exchanged by the participating nodes on a regular and/or event basis. The control packets comprise the control plane of the PTON architecture of the present disclosure. Prescribed control packets facilitate execution of the functions required to allocate bandwidth dynamically according to a fairness criteria.

Turning again to FIG. 2, the PTON 12 operates through two interfaces: a router/packet switch interface 32 and a SONET interface 34. The router/packet switch interface 32 classifies received packets according to their priority. The router/packet switch interface 32 also selects an appropriate ring based on a destination address and queues packets in a transmit buffer for a chosen ring. The SONET interface 34 decapsulates the packets from the received frame, classifies the packets and performs appropriate functions according to their category. The received control packets are directed towards the fairness algorithm processor 30 for later processing. Packets with the destination address equal to that of the local packet switch/router are stripped and sent to the local router interface. Packets transiting through the node are placed in an appropriate transit buffer, according to their priority, and are forwarded in subsequent SONET frames.

By default, packet transmission is given a higher priority over forwarding, however, the queue status are continuously monitored by the fairness algorithm processor. If a prescribed significant increase in buffer lengths are observed, the fairness algorithm processor modifies the scheduling order to stabilize the queues and to avoid packet loss. The process of modifying the scheduling order is explained further herein.

To facilitate the dynamic bandwidth assignment of the present embodiments, certain control messages are exchanged between the neighboring nodes. In one embodiment, control traffic is sent in an opposite direction to the data traffic to enhance the stability of the PTON architecture. Since data traffic can be sent in both directions on the ring, the needed control packets are received from the two immediate neighbors on the ring. The node in the direction of the data traffic will be referred to herein as a downstream neighbor. Since each node in general will have two downstream neighbors, the distinction will be dropped where appropriate and the two immediate nodes denoted as the neighbor nodes.

In one embodiment, control signaling makes up a part of the PTON architecture, as explained herein below.

Control Signaling

The fairness algorithm processor solves the bandwidth assignment problem by operating on states which are local to the given node and those obtained from the neighboring nodes. The state information is obtained through appropriate control packets that are a part of the underlying signaling protocol. Accordingly, no centrally enforced information of the ring is required except the state information from two immediate neighbors.

According to one embodiment, the nodes participating in the dynamic bandwidth assignment are required to exchange certain state information to facilitate this process. The minimum set of control messages required for the fairness algorithm processor to operate includes a consumption message and a contention message. The consumption message is sent at a regular time interval and provides the actual bandwidth usage of a node. The actual bandwidth usage of a node is expressed in terms of number of bits of data transmitted in one SONET frame. The consumption message is also used as a heart beat signal. Accordingly, the consumption message is required even though data is not being transmitted by the given node.

The contention message on the other hand is generated when there is contention of resources on the ring. The contention message encodes the number of bits of data that were dropped during one SONET frame interval by a given node. Both consumption and contention messages are used to drive the fairness algorithm processor for solving the bandwidth assignment problem of the ring network.

Fairness Algorithm Processor

As shown in FIG. 2, the fairness algorithm processor operates on prescribed information provided through control messages and local state information, such as queue lengths and current bandwidth usage, to facilitate dynamic bandwidth assignment. Two major actions performed by the fairness algorithm processor include bandwidth allocation and scheduling of queues in an appropriate order. The fairness algorithm processor includes suitable computer readable program code that is processable by the computer processor for performing the execution of the fairness algorithm and various functions as described herein. The program code can be written using computer programming techniques well known in the art.

Bandwidth Allocation

The bandwidth allocation process of the fairness algorithm processor generates a maximum allowable transmit rate for the given node, $T_i$. The fairness algorithm processor relies on the following states from the local node as well as the downstream neighbor:

f: Current forwarding rate t: Current transmit rate $b^d$: Traffic drop rate

A main idea behind the fairness algorithm is to utilize the available resources within given fairness constraints. Accordingly, the algorithm can be described as:

At a given instant k, maximize the average transmit rate, $\bar{t}_i(k)$, by choosing the allowable bandwidth, $T_i(k)$, such that:

$$\Sigma \bar{t}_i(k) \to \Sigma L_i(k) \tag{1}$$

and the following constraints are satisfied:

$$t_i(k) \leq T_i(k) \tag{2}$$

$$t_i(k) + f_i(k) \leq B \tag{3}$$

$$|\bar{t}_i(k) - \bar{t}_j(k)| \to 0; \forall i, j \ni T_i(k) < L_i(k), T_j(k) < L_j(k) \tag{4}$$

Where $L_i$ is the offered load to the given node, B is the maximum ring bandwidth and $\bar{f}$ is a moving average of a function f defined as:

$$\bar{f}(k) = (1/w)\Sigma^k_{j=k-w} f(j) \tag{5}$$

The conditions described in equations (4) and (1) will be referred to herein as the fairness metrics and utilization metrics, respectively. These metrics will be used to measure the performance of the described algorithm. It should be noted that the fairness condition, as expressed by equation (4), is applicable only when there are contention of resources.

The dynamic bandwidth allocation algorithm, described above, requires that the states between the neighboring nodes are exchanged at a specified time interval. The time instants at which this information exchange takes place are denoted as k, where:

$$k = n_1 * \Delta \tag{6}$$

In equation (6), $\Delta$ is the SONET frame interval and $n_1$ is a design constant. The convergence and stability of the fairness algorithm is a function of the constant $n_1$. As discussed earlier, the state exchange between the two neighboring nodes takes place through two control messages defined as "consumption" and "contention." The consumption message is generated at specified time intervals. For simplicity in one embodiment, it is assumed that the rate at which the consumption message is generated coincides with the bandwidth allocation interval k defined above. The contention message, on the other hand, is generated whenever there are contention of resources on the ring. The contention message is sent to the upstream neighbor whenever the downstream node cannot transmit a packet on the ring due to an excessive amount of packets being forwarded through the node.

Figure 3:
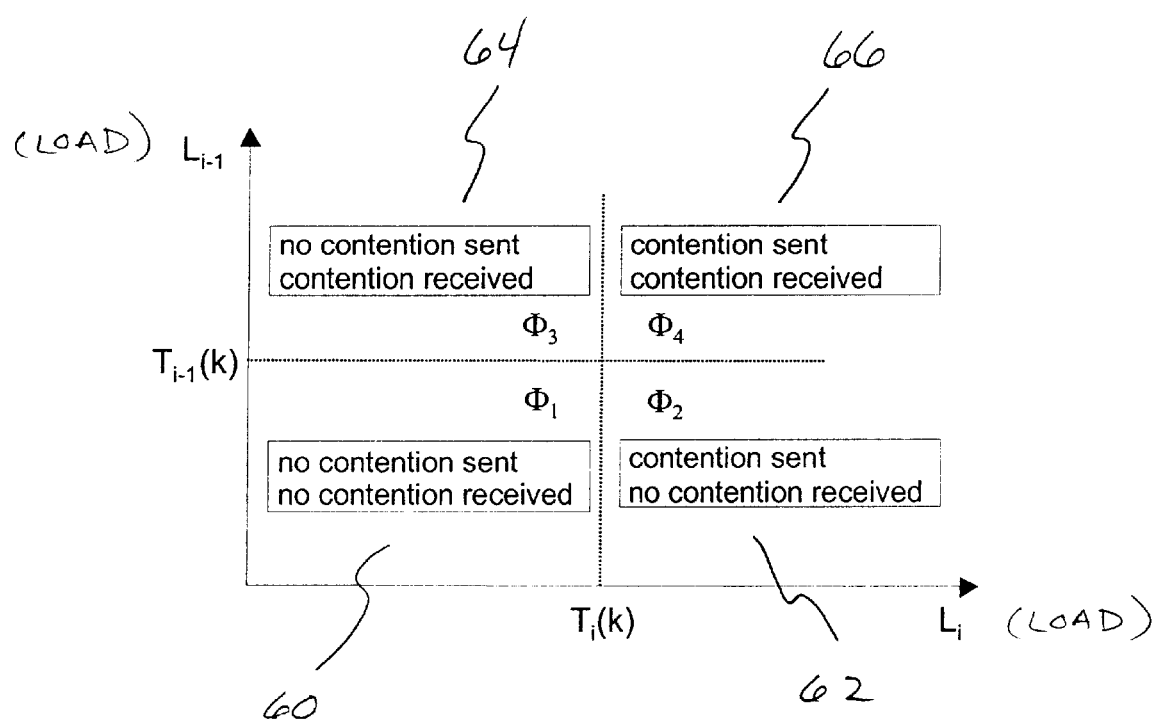
FIG. 3 is a state space diagram view for the fairness algorithm of one embodiment of the present disclosure.

The dynamic bandwidth allocation portion of the fairness algorithm partitions the operating space into four disjoint regions (60,62,64,66) as shown in FIG. 3. The boundaries specifying the regions are dynamically adjusted based on current values of allowable bandwidth $T_i(k)$ and $T_{i-1}(k)$.

The offered load to a given node, denoted $l_i(k)$, determines whether the contention message is sent to the upstream neighbor. If the set of states required to specify the operating range of the fairness algorithm are represented by $\phi$, where:

$$\phi = \{\phi_i \times \phi_{i-1}\}; \phi_i = \{T_i, L_i\} \tag{7}$$

then the system operation at any instant can be mapped uniquely to one of the regions (60,62,64,66) specified in FIG. 3. Furthermore, the behavior of the algorithm within each of the regions facilitates the objectives specified in equations (1) and (4), which are to maximize the utilization of available bandwidth while satisfying the fairness criteria. The actions within each region are described below:

$\phi \in \omega_1$

In this case (denoted by reference numeral 60 in FIG. 3), no contention message is sent or received. The given node is allowed to take credit for the number of bits sourced onto the ring by the neighbor, if the current allocated bandwidth to the node is not sufficient to meet the expected demand. This condition can be expressed by the following:

$$T_i(k) = \quad (8)$$

$$\begin{cases} \{T_i(k-1) + t_{i-1}(k-1)\} & \text{if } (T_i(k-1) - \tilde{t}_i(k)) < \tilde{t}_{i-1}(k) \text{ else} \\ T_i(k-1) \end{cases}$$

Where the variables $\tilde{t}_i(k)$ and $\tilde{t}_{i-1}(k)$ are an estimate of the amount of transmit bandwidth required for the current interval for local and neighbor node respectively. For simplicity, in one embodiment, a sample and hold estimate is used, i.e., $\tilde{t}_i(k)=t_i(k-1)$ and $\tilde{t}_{i-1}(k)=t_{1-1}(k-1)$.

$\phi \in \omega_2$

In this case (denoted by reference numeral 62 in FIG. 3), no contention message is received. However, since a contention message is sent, the fairness algorithm allocates as much of the available bandwidth as possible to remove the contention at the local node. This condition can be expressed by the following:

$$T_i(k)=T_i(k-1)+\max\{t_{i-1}(k-1), b^d_i(k-1)\} \quad (9)$$

$\phi \in \omega_3$

In this case (denoted by reference numeral 64 in FIG. 3), contention message is received. However, no contention message is sent. In order to facilitate the fairness criteria, the fairness algorithm reduces the allocated bandwidth to the given node as much as possible. This condition is characterized by the following expression:

$$T_i(k) = \begin{cases} \{T_i(k-1) - \min(b^d_{i-1}(k-1), \\ (T_i(k-1) - \tilde{t}_i(k)))\} & \text{if } (T_i(k-1) - \tilde{t}_i(k)) > 0 \text{ else} \\ T_i(k-1) \end{cases}$$

Where $\tilde{t}_1(k)=t_i(k-1)$. In equation (10), if the allocated bandwidth to the node 'i' is sufficient to transmit the same number of bits as were transmitted in a previous interval, then the excess bandwidth can be reduced, increasing the probability of the downstream node, i–1, to reduce its contention.

$\phi \in \omega_4$

In this case (denoted by reference numeral 66 in FIG. 3), the contention message is sent and is also received. The fairness algorithm in this case adjusts the allocated bandwidth dynamically so as to meet the fairness criteria of equation (4) while satisfying the utilization metric given in equation (1). This condition is characterized by the following expression:

$$T_i(k)=T_i(k-1)+$$
$$C_1 \Delta e_1(k)+$$
$$C_2 \Delta e_2(k)+$$
$$C_3 \Delta e_3(k)+$$
$$C_4(e_1(k)-e_1(k-1))+$$
$$C_5(e_2(k)-e_2(k<1))+$$
$$C_6(e_3(k)-e_3(k-1))) \quad (11)$$

where:

$$e_1(k)=\tilde{b}^d_i(k)-\tilde{b}^d_{i-1}(k) \quad (12)$$

$$e_2(k)=\tilde{t}_{i-1}(k)-\tilde{t}_i(k) \quad (13)$$

$$e_3(k)=\tilde{f}_i(k)-\tilde{f}_{i-1}(k) \quad (14)$$

and where $C_1, \ldots, C_6$ are design constants. In equation (11), equilibrium is reached when the fairness criteria is satisfied.

It should be noted that for the bandwidth allocation process of the present embodiments, no central control is required. Accordingly, the fairness algorithm can be implemented in a distributed manner. As described earlier, for maintaining queue stability, the fairness algorithm can change the scheduling priority. The change in scheduling priority of algorithm is explained further herein below.

Scheduling Order

During normal operation, the packet scheduling is performed in the following order: T {n}, F {n}, T {n–1}, F {n–1}, . . . , T {0}, F {0}, where T {n}, F {n}, represent transmitting and forwarding of packets belonging to class with priority 'n'. It should be noted that, by default, transmission of packets is given the higher priority. Similarly, forwarding of class 'n' has higher priority over forwarding of class 'n–1'. For a stable operation of the PTON architecture of the present disclosure, it is required that, under normal condition, packets forwarding through a node are never dropped. Hence to ensure this, queue lengths of the transit buffers are monitored continuously and if the queue lengths exceed a pre-defined threshold, the scheduling priority is changed so as to avoid possible packet loss. In particular, it is possible that packets of class '0' are forwarded in preference to those belonging to class 'n', if the transit buffer length corresponding to class '0' is beyond critical threshold. Accordingly, to avoid potential problems with queue overflows from one class to effect other classes, some form of admission control may be required.

A performance of the fairness algorithm according to the present disclosure has been verified through the use of an OPNET simulation tool. The simulation results are described herein below.

The OPNET is a discrete event simulation tool available from OPNET Technologies Inc, Washington D.C. OPNET simulation tool is used by the world's leading network technology companies and service providers to design and analyze advanced communications network technologies, network devices, and protocols.

Simulation Results

Figure 4:
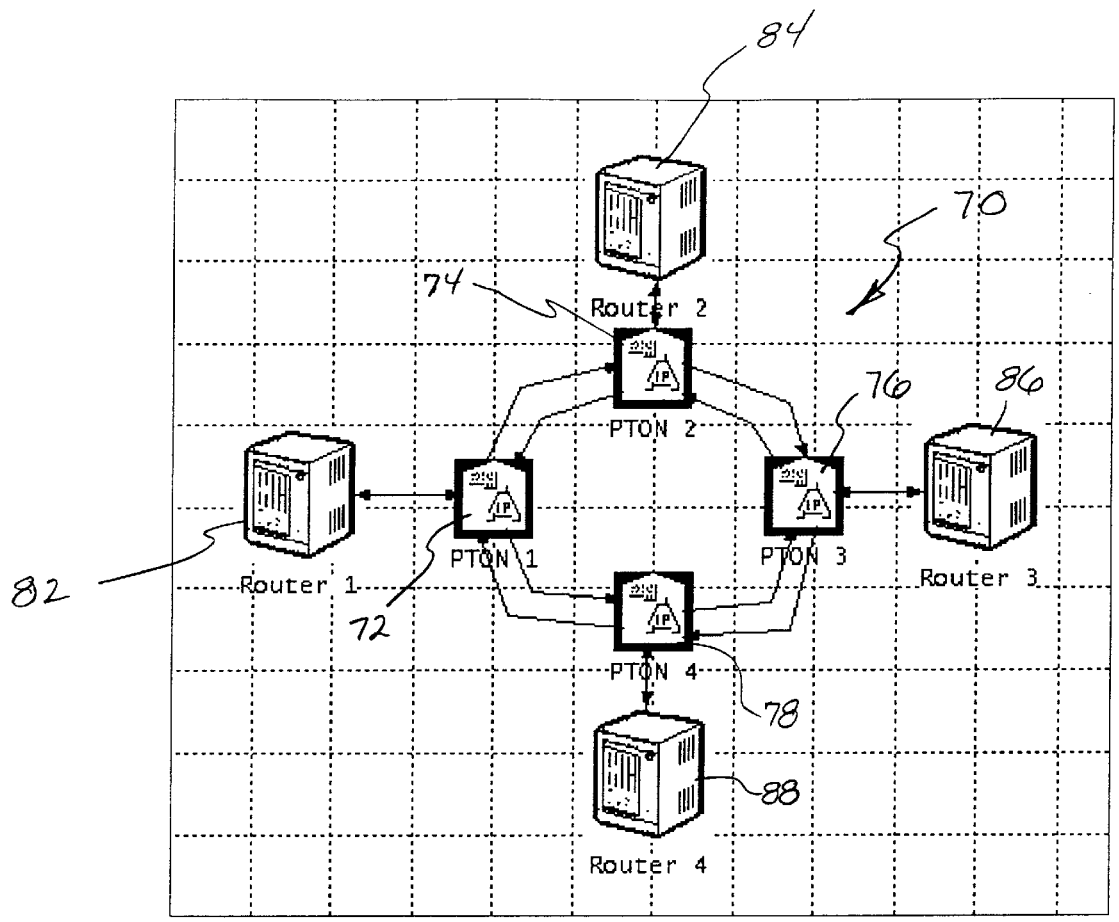
FIG. 4 shows a schematic view of a four node PTON architecture that was used in a simulation model in accordance with the embodiments of the present disclosure.

An exemplary PTON architecture, based upon the architecture of FIG. 1, has been simulated using an OPNET simulation tool. A four-node version of the simulation model is shown in FIG. 4, where the connectivity is provided through a SONET ring operating at an OC-3 rate. As shown in FIG. 4, the network 70 includes four PTON nodes (72,74,76,78). Each of the nodes provide an interface between a respective router (82,84,86,88) and the SONET ring 70.

To demonstrate the performance of the fairness algorithm, indices have been defined to measure the fairness and utilization matrices as defined in equations (4) and (1), respectively.

Fairness Index

A fairness index identifies the effectiveness of the algorithm to provide fair access to the shared resources. For a given scenario, the fairness index (F) is calculated as:

$$F=\min(t_i)/\max(t_j); i, j \ni L_i \geq t_i, L_j \geq t_j \quad (15)$$

Utilization Index

A utilization index identifies the effectiveness of the algorithm to fully utilize available resources. For a given scenario, utilization index (U) is calculated as:

$$U=\mathrm{mean}_i(\bar{t}_i)/\max(T_i) \forall i \ni L_i \geq \max(T_i) \quad (16)$$

In order for utilization index to make any sense, it is required that the offered load, $L_i$, for a given node is greater than the maximum allocated rate, max $(T_i)$, where max $(T_i)=(B/n)$ under homogeneous load conditions.

Figure 5:
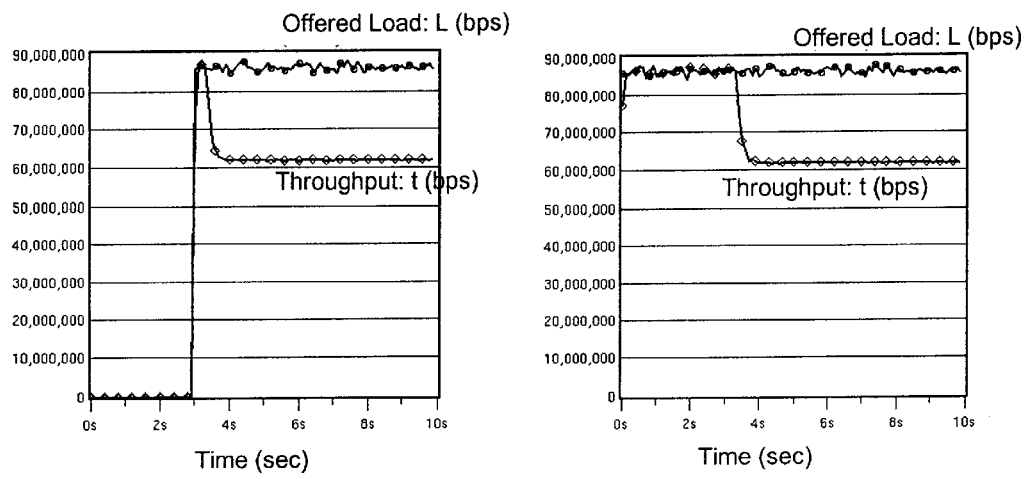
FIG. 5 shows graphical output views of offered load and throughput of a first router and a second router, respectively, of FIG. 4 with respect to a first simulation scenario.
Figure 6:
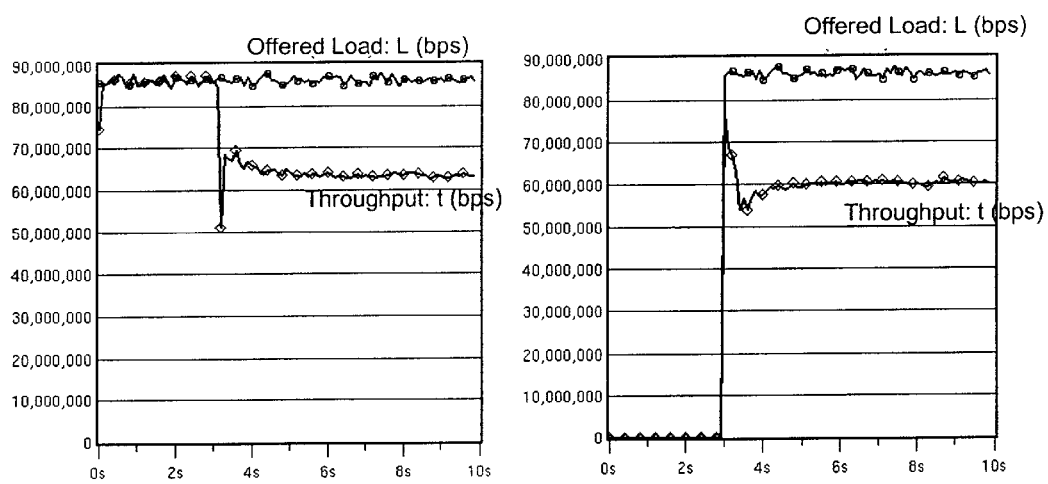
FIG. 6 shows graphical output views of offered load and throughput of a first router and a second router, respectively, of FIG. 4 with respect to a second simulation scenario.

To demonstrate a performance of the fairness algorithm, two scenarios were simulated as presented below and as shown in FIGS. 5 and 6, respectively.

Scenario 1

In a first scenario, a symmetric load is assumed on the outer ring only. More specifically:

$L_1(t)$=87 Mbps for $t\geq 3$ s; destination Router 3

$L_2(t)$=87 Mbps for $t\geq 0$ s; destination Router 4

$L_3(t)$=87 Mbps for $t\geq 3$ s; destination Router 1

$L_4(t)$=87 Mbps for $t\geq 0$ s; destination Router 2

The results for this first scenario are shown in FIG. 5. From t=0 to t=3 sec, when only Router 2 and 4 are active, the offered load can be carried without any contention. However, at t=3 sec, Routers 1 and 3 become active on the same ring, this requires that the effective throughput of Routers 2 and 4 be reduced to a level where the available resources can be shared among all the active nodes. As shown in FIG. 5, the symmetric load from all the nodes results in a uniform equilibrium point at 62 Mbps. In this case, the fairness index, F=1.0 and utilization index, U=0.97, are achieved, where 3% is the protocol overhead.

Scenario 2

In a second scenario, an asymmetric load is assumed on both rings. More specifically:

$L_1(t)$=87 Mbps for $t\geq 0$ s; destination Router 3 on outer ring $L_2(t)$=87 Mbps for $t\geq 3$ s; destination Router 4 on outer ring $L_3(t)$=87 Mbps for $t\geq 0$ s; destination Router 1 on inner ring $L_4(t)$=87 Mbps for $t\geq 3$ s; destination Router 2 on inner ring The results for this second scenario are shown in FIG. 6. From t=0 to t=3 sec, when only Router 1 and 3 are active, the offered load can be carried without any contention. However, at t=3 sec, Routers 2 and 4 become active too. In this case, even though Routers 1 and 4 are not involved in forwarding of the packets, the fairness algorithm allocates enough bandwidth to each node so that an almost uniform throughput can be reached for all active nodes. In this case, the fairness index, F=0.98 and utilization index, U=0.97 are achieved.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for dynamic bandwidth allocation in a packet switched network having a ring architecture, the method comprising:

monitoring an occurrence of a contention of resources at a participating node and its neighboring nodes on the network; and dynamically allocating bandwidth according to a fairness algorithm in response to a monitored occurrence of the contention of resources, said step of dynamically allocating bandwidth for resolving the contention of resources in a fair manner within given fairness constraints while enabling a prescribed maximum utilization of available bandwidth between the nodes, wherein the fairness algorithm generates fairness criteria in response to states that are local to the participating node and states obtained from the neighboring nodes.

2. The method of claim 1, wherein dynamically allocating bandwidth according to the prescribed fairness algorithm further includes resolving the contention of resources in a fair manner while maximizing the utilization of available bandwidth.

3. The method of claim 1, wherein the participating node includes at least one of the following selected from the group consisting of a packet switch, packet router, and transport node.

4. The method of claim 1, wherein the participating node exchanges packets through concatenated SONET frames.

5. The method of claim 1, further wherein each node is allowed to transmit data at a full data rate supported by a respective connection media so long as there are no contentions of resources, and responsive to a detection of contention of resources, the fairness algorithm assigning appropriate resources to each node such that a prescribed fairness condition is satisfied.

6. The method of claim 1, further comprising:

generating control packets for use in dynamically allocating bandwidth according to the fairness criteria; and exchanging the control packets between neighboring nodes to facilitate dynamic bandwidth assignment.

7. The method of claim 1, wherein said monitoring and said dynamically allocating bandwidth occurs in a packet transport optimized node (PTON), the PTON operating through at least two interfaces including a router/packet switch interface and a SONET interface.

8. The method of claim 7, wherein the router/packet switch interface classifies a received packet according to a respective priority, selects an appropriate ring based on a destination address, and queues the packet in a transmit buffer of a chosen ring.

9. The method of claim 7, wherein the SONET interface decapsulates packets from a received frame, classifies each packet and performs an appropriate function according to a category of each packet, and directs control packets to the fairness algorithm for processing.

10. The method of claim 9, further wherein the SONET interface 1) strips packets with a destination address equal to that of a local packet switch/router and routes the stripped packets to the router interface, and 2) places packets transiting through the node in appropriate transit buffer according to a respective priority, wherein the packets are forwarded in subsequent SONET frames.

11. The method of claim 1, further comprising:

generating a fairness index for identifying an effectiveness of the fairness algorithm to provide a fair access to shared resources; and generating a utilization index for identifying an effectiveness of the fairness algorithm to provide a full utilization of available resources.

12. A method for dynamic bandwidth allocation in a packet switched network having a ring architecture, the method comprising:

monitoring an occurrence of a contention of resources at a participating node and its neighboring nodes on the network;

dynamically allocating bandwidth according to a fairness algorithm in response to a monitored occurrence of the contention of resources, said step of dynamically allocating bandwidth for resolving the contention of resources in a fair manner within given fairness constraints while enabling a prescribed maximum utilization of available bandwidth between the nodes, wherein the fairness algorithm generates fairness criteria in response to states that are local to the participating node and states obtained from the neighboring nodes;

generating control packets for use in dynamically allocating bandwidth according to the fairness criteria;

exchanging the control packets between neighboring nodes to facilitate dynamic bandwidth assignment;

generating a fairness index for identifying an effectiveness of the fairness algorithm to provide a fair access to shared resources; and generating a utilization index for identifying an effectiveness of the fairness algorithm to provide a full utilization of available resources.

13. The method of claim 12, wherein the participating node includes at least one of the following selected from the group consisting of a packet switch, packet router, and transport node.

14. The method of claim 12, wherein the participating node exchanges packets through concatenated SONET frames.

15. The method of claim 12, further wherein each node is allowed to transmit data at a full data rate supported by a respective connection media so long as there are no contentions of resources, and responsive to a detection of contention of resources, the fairness algorithm assigning appropriate resources to each node such that a prescribed fairness condition is satisfied.

16. A packet switched network ring architecture including dynamic bandwidth allocation, the network comprising:

at least one participating node;

at least two neighboring nodes of said participating node;

means for monitoring an occurrence of a contention of resources at said participating node and said neighboring nodes on the network; and means responsive to a monitored occurrence of the contention of resources for dynamically allocating bandwidth according to a fairness algorithm for resolving the contention of resources in a fair manner within given fairness constraints while enabling a prescribed maximum utilization of available bandwidth between the nodes, wherein the fairness algorithm generates fairness criteria in response to states that are local to said participating node and states obtained from said neighboring nodes.

17. The network of claim 16, wherein said means for dynamically allocating bandwidth further includes means for resolving the contention of resources in a fair manner while maximizing the utilization of available bandwidth.

18. The network of claim 16, wherein said participating node includes at least one of the following selected from the group consisting of a packet switch, packet router, and transport node.

19. The network of claim 16, wherein said participating node exchanges packets through concatenated SONET frames.

20. The network of claim 16, further wherein each node is allowed to transmit data at a full data rate supported by a respective connection media so long as there are no contentions of resources, and responsive to a detection of contention of resources, the fairness algorithm assigning appropriate resources to each node such that a prescribed fairness condition is satisfied.

21. The network of claim 16, further comprising:

means for generating control packets for use in dynamically allocating bandwidth according to the fairness criteria; and means for exchanging the control packets between said neighboring nodes to facilitate dynamic bandwidth assignment.

22. The network of claim 16, further comprising a packet transport optimized node (PTON), wherein said PTON contains said monitoring means and said dynamically allocating bandwidth means, the PTON operating through at least two interfaces including a router/packet switch interface and a SONET interface.

23. The network of claim 22, wherein the router/packet switch interface classifies a received packet according to a respective priority, selects an appropriate ring based on a destination address, and queues the packet in a transmit buffer of a chosen ring.

24. The network of claim 22, wherein the SONET interface decapsulates packets from a received frame, classifies each packet and performs an appropriate function according to a category of each packet, and directs control packets to the fairness algorithm for processing.

25. The network of claim 24, further wherein the SONET interface 1) strips packets with a destination address equal to that of a local packet switch/router and routes the stripped packets to the router interface, and 2) places packets transiting through the node in appropriate transit buffer according to a respective priority, wherein the packets are forwarded in subsequent SONET frames.

26. The network of claim 16, further comprising:

means for generating a fairness index for identifying an effectiveness of the fairness algorithm to provide a fair access to shared resources; and means for generating a utilization index for identifying an effectiveness of the fairness algorithm to provide a full utilization of available resources.

27. A network for dynamic bandwidth allocation in a packet switched network having a ring architecture, the network comprising:

at least one participating node;

at least two neighboring nodes of said participating node;

means for monitoring an occurrence of a contention of resources at said participating node and said neighboring nodes on the network;

means responsive to a monitored occurrence of the contention of resources for dynamically allocating bandwidth according to a fairness algorithm for resolving the contention of resources in a fair manner within given fairness constraints while enabling a prescribed maximum utilization of available bandwidth between said nodes, wherein the fairness algorithm generates fairness criteria in response to states that are local to said participating node and states obtained from said neighboring nodes;

means for generating control packets for use in dynamically allocating bandwidth according to the fairness criteria;

means for exchanging the control packets between said neighboring nodes to facilitate dynamic bandwidth assignment;

means for generating a fairness index for identifying an effectiveness of the fairness algorithm to provide a fair access to shared resources; and means for generating a utilization index for identifying an effectiveness of the fairness algorithm to provide a full utilization of available resources.

28. The network of claim 27, wherein said participating node includes at least one of the following selected from the group consisting of a packet switch, packet router, and transport node.

29. The network of claim 27, wherein said participating node exchanges packets through concatenated SONET frames.

30. The network of claim 27, further wherein each node is allowed to transmit data at a full data rate supported by a respective connection media so long as there are no contentions of resources, and responsive to a detection of contention of resources, the fairness algorithm assigning appropriate resources to each node such that a prescribed fairness condition is satisfied.

31. A network element for facilitating dynamic bandwidth allocation in a packet switched network having a ring architecture, the network element comprising:

means for monitoring an occurrence of a contention of resources at a participating node and its neighboring nodes on the network; and means responsive to a monitored occurrence of the contention of resources for dynamically allocating bandwidth according to a fairness algorithm for resolving the contention of resources in a fair manner within given fairness constraints while enabling a prescribed maximum utilization of available bandwidth between the nodes, wherein the fairness algorithm generates fairness criteria in response to states that are local to the participating node and states obtained from the neighboring nodes.

32. The network element of claim 31, further comprising:

means for generating control packets for use in dynamically allocating bandwidth according to the fairness criteria; and means for exchanging the control packets between the neighboring nodes to facilitate dynamic bandwidth assignment.

33. The network element of claim 31, further comprising:

means for generating a fairness index for identifying an effectiveness of the fairness algorithm to provide a fair access to shared resources; and means for generating a utilization index for identifying an effectiveness of the fairness algorithm to provide a full utilization of available resources.

34. A computer program product for dynamic bandwidth allocation in a packet switched network having a ring architecture, comprising:

a computer program processable by a computer system for causing the computer system to:

monitor an occurrence of a contention of resources at a participating node and its neighboring nodes on the network; and dynamically allocate bandwidth according to a fairness algorithm in response to a monitored occurrence of the contention of resources, wherein dynamically allocating bandwidth resolves the contention of resources in a fair manner within given fairness constraints while enabling a prescribed maximum utilization of available bandwidth between the nodes, wherein the fairness algorithm generates fairness criteria in response to states that are local to the participating node and states obtained from the neighboring nodes; and apparatus from which the computer program is accessible by the computer system.

35. The computer program product of claim 34, wherein the computer program is processable by the computer system for further causing the computer system to:

generate control packets for use in dynamically allocating bandwidth according to the fairness criteria; and exchange the control packets between neighboring nodes to facilitate dynamic bandwidth assignment.

36. The computer program product of claim 35, further wherein the computer program is processable by the computer system for further causing the computer system to:

generate a fairness index for identifying an effectiveness of the fairness algorithm to provide a fair access to shared resources; and generate a utilization index for identifying an effectiveness of the fairness algorithm to provide a full utilization of available resources.

* * * * *